(12) United States Patent
Chang et al.

(10) Patent No.: US 11,768,903 B2
(45) Date of Patent: Sep. 26, 2023

(54) AUTO SEED: AN AUTOMATIC CRAWLER SEEDS ADAPTATION MECHANISM

(71) Applicant: INTERNATIONAL BUSINESS MACHINES CORPORATION, Armonk, NY (US)

(72) Inventors: Chao-Min Chang, Taipei (TW); Ying-Chen Yu, Taipei (TW); June-Ray Lin, Taipei (TW); Kuei-Ching Lee, New Taipei (TW); Curtis C H Wei, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 16/906,077

(22) Filed: Jun. 19, 2020

(65) Prior Publication Data

US 2021/0397659 A1  Dec. 23, 2021

(51) Int. Cl.
| | | |
|---|---|---|
| *G06F 16/95* | (2019.01) |
| *G06F 16/955* | (2019.01) |
| *G06N 20/00* | (2019.01) |
| *G06N 5/04* | (2023.01) |
| *G06F 40/30* | (2020.01) |
| *G06F 16/951* | (2019.01) |
| G06F 40/169 | (2020.01) |
| G06F 40/295 | (2020.01) |
| G06F 40/205 | (2020.01) |

(52) U.S. Cl.
CPC ......... *G06F 16/955* (2019.01); *G06F 16/951* (2019.01); *G06F 40/30* (2020.01); *G06N 5/04* (2013.01); *G06N 20/00* (2019.01); *G06F 40/169* (2020.01); *G06F 40/205* (2020.01); *G06F 40/295* (2020.01)

(58) Field of Classification Search
CPC .................................................... G06F 16/955
See application file for complete search history.

(56) References Cited

U.S. PATENT DOCUMENTS

| | | | |
|---|---|---|---|
| 7,379,932 B2 | 5/2008 | Agrawal | |
| 8,484,180 B2 | 7/2013 | Dmitriev | |
| 9,477,758 B1 | 10/2016 | Tong et al. | |
| 9,489,460 B2 | 11/2016 | Wexler et al. | |
| 9,519,870 B2 * | 12/2016 | Sarikaya | G06N 20/00 |
| 9,760,556 B1 | 9/2017 | Knudson et al. | |
| 2002/0156779 A1* | 10/2002 | Elliott | G06F 16/9537 |
| 2019/0347668 A1* | 11/2019 | Williams | G06N 20/00 |
| 2020/0111027 A1* | 4/2020 | Qin | G06Q 30/0282 |
| 2021/0120034 A1* | 4/2021 | Starov | H04L 63/14 |

FOREIGN PATENT DOCUMENTS

WO     2019182593 A1   9/2019

* cited by examiner

*Primary Examiner* — Syling Yen
(74) *Attorney, Agent, or Firm* — Conley Rose, P.C.

(57) ABSTRACT

A computer-implemented method for automatically adjusting a Uniform Resource Locator (URL) seed list. The method includes crawling for documents based on a seed URL list. The method generates relations data from the documents using a Natural Language Processing (NLP) model. The method analyzes the relations data using an auto-seed model. The method modifies the seed URL list.

17 Claims, 4 Drawing Sheets

AUTO SEED: AN AUTOMATIC CRAWLER SEEDS ADAPTATION MECHANISM

BACKGROUND

Natural language processing (NLP) is one area of artificial intelligence that uses computational linguistics that provides parsing and semantic interpretation of text, which allows systems to learn, analyze, and understand human language. NLP enables the automatic handling of natural human language like speech or text. NLP has a variety of uses including filtering and classifying emails as spam before they even enter an inbox, tracking news reports or other information on the World Wide Web, performing machine translations, and facilitating human interactions with machines or other devices through the use of natural language.

SUMMARY

The process of collecting documents through web crawling is essential for many NLP models. However, many unwanted or irrelevant pages are crawled and fed into the NLP model. This results in a lot of valuable system and human resources being wasted. Moreover, many wanted pages are not crawled due to a limited crawler seed Uniform Resource Locators (URLs) list. To address these issues, the disclosed embodiments provide an automatic crawler seed adaptation mechanism for NLP annotation models. Benefits of the disclosed embodiments include, but are not limited to, automatically adjusting a seed URLs list according to the given NLP model; filtering out useless seeds by automatically evaluating the productivity of the NLP model; discovering new potential useful seeds using machine learning models that predict the productivity given a seed front page; and leveraging the collaboration of original seeds, extended seeds, search engine seeds, and random seeds.

In one embodiment, a computer-implemented method for automatically adjusting a URL seed list for an NLP model is disclosed. The method includes crawling for documents based on a seed URL list; generating relations data from the documents using an NLP model; analyzing the relations data using an auto-seed model; and modifying the seed URL list.

In another embodiment, a system configured to automatically adjust a URL seed list for an NLP model is disclosed. The system includes memory for storing instructions, and a processor configured to execute the instructions to: crawl for documents based on a seed URL list; generate relations data from the documents using the NLP model; analyze the relations data using an auto-seed model; and modify the seed URL list.

In another embodiment, a computer program product for automatically adjusting a URL seed list for an NLP model is disclosed. The computer program product comprising a computer readable storage medium having program instructions embodied therewith, the program instructions executable by a processor of a system to cause the system to: crawl for documents based on a seed URL list; generate relations data from the documents using the NLP model; analyze the relations data using an auto-seed model; and modify the seed URL list.

Optionally, in any of the preceding embodiments, modifying the seed URL list comprises removing a seed URL from the seed URL list.

Optionally, in any of the preceding embodiments, modifying the seed URL list comprises expanding the seeds in the seed URL list to include a new seed URL, the new seed URL predicted to produce quality relations data by the NLP model.

Optionally, in any of the preceding embodiments, the new seed URL is selected from at least one of a randomly generated seed URL list, a search engine generated seed URL list, and an extended seed URL list.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry that is configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Figure 1:
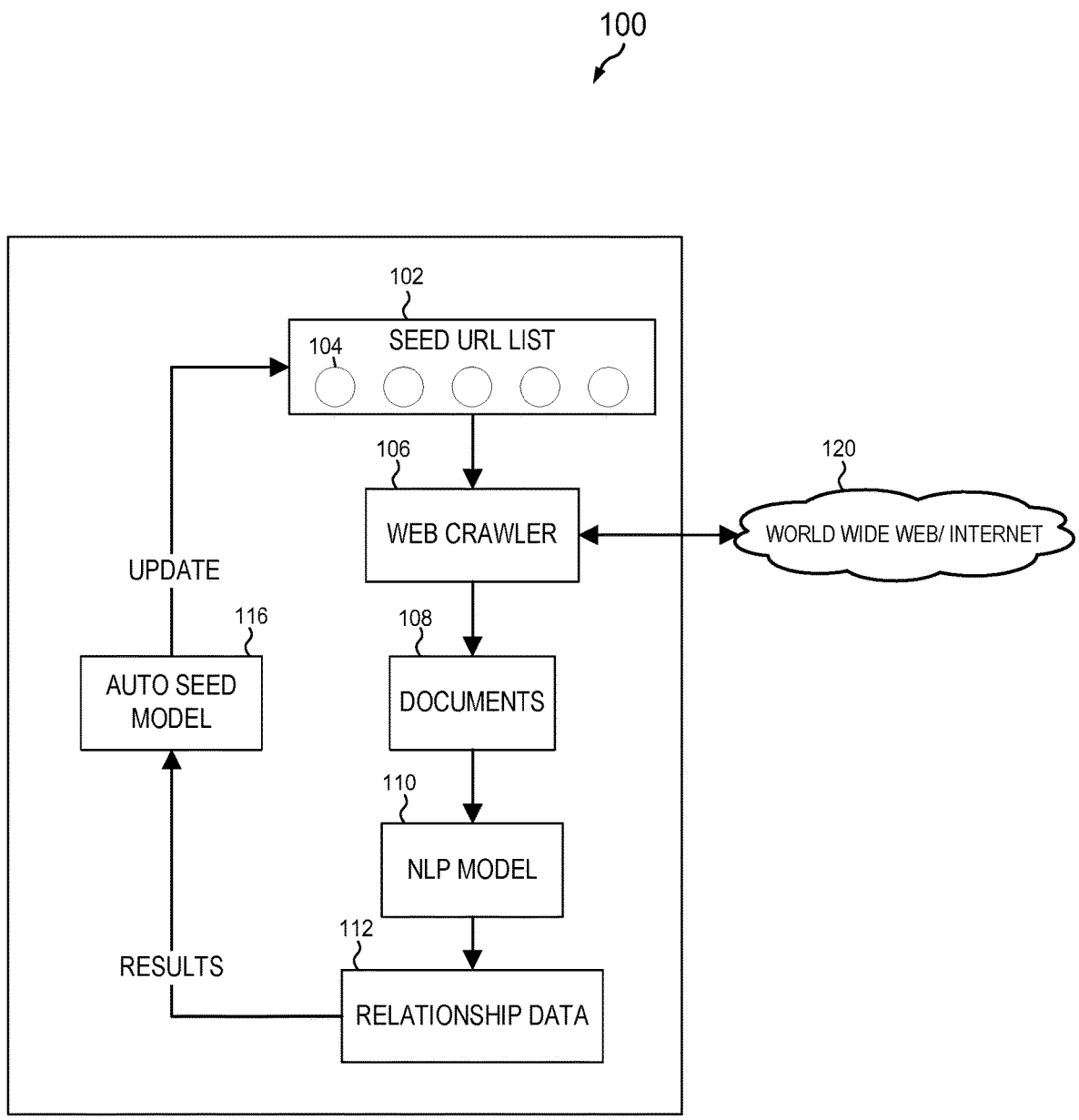
FIG. 1 is a schematic diagram illustrating a named entity recognition (NER) system in accordance with an embodiment of the present disclosure.

FIG. 1 is a schematic diagram illustrating a NER system 100 in accordance with an embodiment of the present disclosure. In an embodiment, the NER system 100 is designed to identify and build relations/relationships using an NLP model 110 based on a seed URL list 102. A relation is a connection between two or more entities. An entity is a thing such as, but not limited to, a person, an organization, or a place. The connection between the two entities is a relationship. For example, the entities "President" and "White House" can be connected by the relationship "lives in." The relationship data between the various entities can then be used in various NLP applications.

To build the relationships, the NER system 100 starts with the seed URL list 102, which contains one or more seed URLs 104. A seed URL is a URL address that is specified as a starting point for a web crawler 106. For example, in some embodiments, a seed URL can be a front page/an entire website (e.g., http://www.whitehouse.gov or http://www.archive.org), a specific part (directory) of a website (e.g., http://www.whitehouse.gov/issues/foreign-policy/), or a specific document (e.g., http://www.whitehouse.gov/sites/default/files/rss_viewer/strategy.pdf). The seed URL list 102 can be any generically available seed URL list or can be a custom built seed URL list. The seed URLs 104 included in the seed URL list 102 determines the scope of the crawls and the content/documents that are collected by the web crawler 106. For instance, the web crawler 106 can systematically browse the World Wide Web/Internet 120 or a web archived database (e.g., Archive-It backend) to collect web pages or documents 108 based on the seed URLs 104 included in the seed URL list 102.

The documents 108 are then passed to a NLP model 110 to identify and segment the named entities found within the documents 108. The NLP model 110 is a machine learning model that has been trained using sample annotated documents to be able to perform automated annotations on the documents 108 to generate relationship data 112. The NLP model 110 can be any type of model that annotates entity (key word: name entity recognition) and build relations (key word: dependency parsing). Annotations is the process of identifying and tagging/encoding particular terms or phrases with metadata that classifies or categorizes the named entities under various predefined classes so that the NER system 100 or other systems/devices are able to understand the semantic meaning of language. For example, the annotation process can annotate different parts of a language's syntax such as part of speech (POS), phrase structure, and dependency structure. Non-limiting examples of metadata that can be attached or tagged to word during the annotation process include adjective, noun (singular), noun (plural), proper noun, adverb, verb, preposition, and possessive pronoun.

The relationship data 112 produced by the NLP model 110 on the collected documents 108 are then evaluated by an auto-seed model 116. In an embodiment, the auto-seed model 116 is a machine learning model that has been trained to determine the usefulness of the relationship data 112 generated from a particular seed URL in the seed URL list 102. In an embodiment, the auto-seed model 116 can include or utilize an evaluator that is configured to calculate the ratio of good/bad relations in the relationship data 112 with real-world structured data to determine a quality of a seed URL. The threshold for determining the quality or usefulness of a seed URL can be user-specified during the training process of the auto-seed model 116. Alternatively, a default threshold can be set. As a non-limiting example, a seed URL can be deemed useful when more than 70% of the entities in the relationship data 112 generated from the seed URL have a direct relationship. If the auto-seed model 116 determines that a seed URL is not useful (i.e., does not meet a user-defined quality threshold), the NER system 100 is configured to update the seed URL list 102 by removing the seed URL and/or related seed URL(s) (e.g., a directory of the seed URL) from the seed URL list 102. By removing the useless seed URL(s), the NER system 100 is able to direct its resources to more useful seed URL(s).

Figure 2:
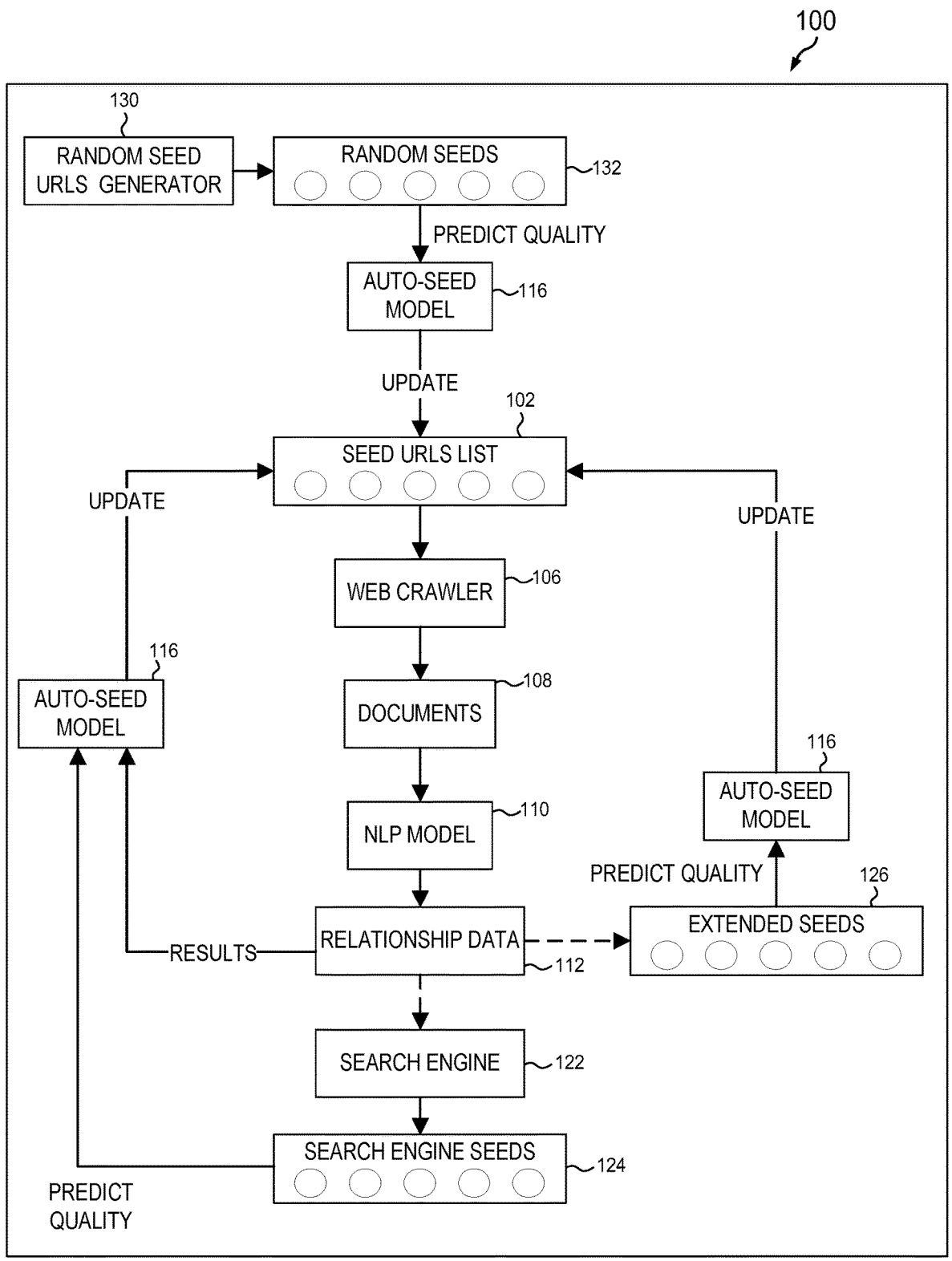
FIG. 2 is a schematic diagram illustrating a NER system in accordance with an embodiment of the present disclosure.

In some embodiments, the NER system 100 can also update the seed URL list 102 by adding new seed URL(s) that are predicted to be useful seed URL(s). As an example, FIG. 2 is a schematic diagram illustrating how the NER system 100 can expand the seed URL list 102 based on the original seed URLs in the seed URL list 102, extended seeds 126, search engine seeds 124, and/or random seeds 132. In an embodiment, the extended seeds 126 are generated by the NER system 100 by identifying links to different websites/pages found in the documents 108 that are generated during the crawling process. The extended seeds 126 are passed to the auto-seed model 116. The auto-seed model 116 is trained to predict/determine which of the seed URLs in the extended seeds 126 will produce quality relationship data 112. For example, by comparing sample training data to predicted documents generated by an extended seed URL, the auto-seed model 116 can predict whether the extended seed URL will generate quality relations. In an embodiment, only the seed URLs in the extended seeds 126 predicted to produce quality relationship data 112 are added to the seed URL list 102.

In an embodiment, the search engine seeds 124 are generated by passing keywords or search terms found in the relationship data 112 to a search engine 122. The search engine 122 performs a search of the web or other archived database using the keywords. The results of the search produces various search engine seed URLs. For example, if the keywords "greatest" and "sports" are passed to the search engine 122, the search engine seed URLs could include seed URLS to documents/pages related to the greatest sports moments, the greatest sports athletes for each particular sport or overall, and the best sports websites. Similarly, the search engine seeds 124 are then passed to the auto-seed model 116 to enable the NER system 100 to predict whether the search engine seeds 124 will produce quality relationship data 112. The seed URLs in the search engine seeds 124 that are predicted to produce quality relationship data 112 are added to the seed URL list 102.

In an embodiment, the random seeds 132 are generated by a random seed URLs generator 130. In an embodiment, the random seed URLs generator 130 is coded to generate random seed URLs by producing random Internet Protocol version 4 (IPv4) and/or Internet Protocol version 6 (IPv6) addresses. In an embodiment, the random seed URLs generator 130 generates a random integer with 32 random bits for an IPv4 address and/or a random integer with 128 random bits for an IPv6 address. Alternatively, the random seed URLs generator 130 can produce IPv4 and/or IPv6 addresses for a particular subnet (e.g., 10.0.0.0/24) by generating only 8 random bits, and appending the 8 random bits to the subnet. As described above, the random seeds 132 are passed to the auto-seed model 116 to enable the NER system 100 to predict whether the seed URLs in the random seeds 132 will produce quality relationship data 112. The random seed URLs in the random seeds 132 that are predicted to produce quality relationship data 112 are added to the seed URL list 102.

Figure 3:
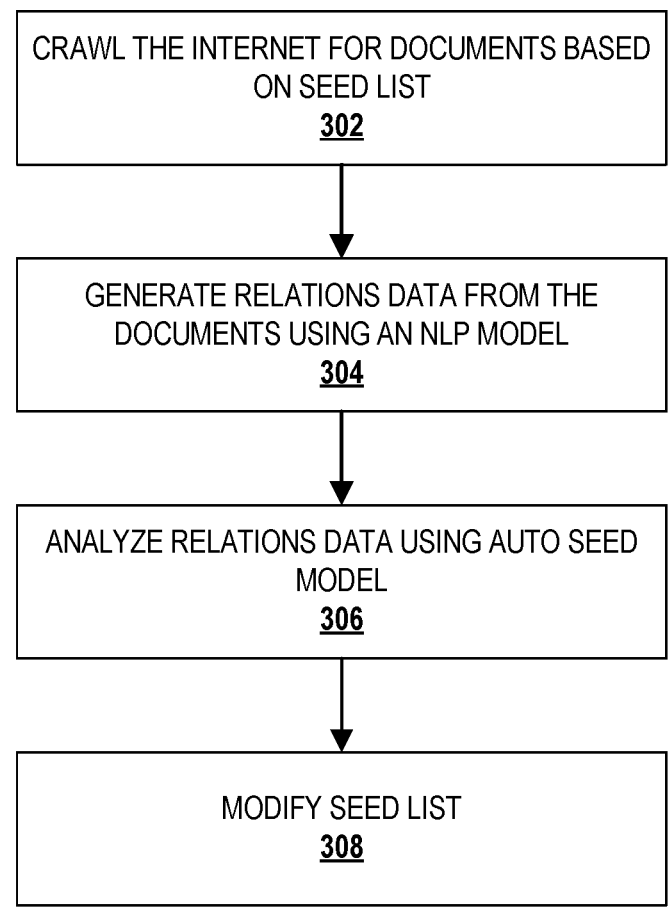
FIG. 3 is flowchart illustrating a process for automatically adjusting a URL seed list for an NLP model in accordance with an embodiment of the present disclosure.

FIG. 3 is a flowchart diagram illustrating a process 300 for automatically adjusting a URL seed list in accordance with an embodiment of the present disclosure. The process 300 can be performed by the NER system 100 in FIG. 1 or in FIG. 2. The process 300 begins at step 302 by crawling (i.e., via a web crawler) the web and/or a web archived database for documents based on a seed URL list that contains one or more seed URLs. At step 304, the process 300 generates relations data by annotating the documents using an NLP model. The relations data can contain thousands or millions of relationships between various entities. The process 300, at step 306, analyzes or evaluates the relations data using an auto seed model. As stated above, the analysis can evaluate the ratio of good/bad relations in the relations data in comparison with real-world structured data. At step 308, the process 300 modifies the seed URL list based on the predicted usefulness or quality of a seed URL. In some embodiments, the process 300 can remove URL seeds from the seed URL list that are predicted to be not useful (i.e., good/bad relations ratio fall below a threshold), and discover and add new URL seeds to the seed URL list that are predicted to be useful. By performing the process 300, resources are not spent on collecting and annotating documents that do not produce quality relations data.

Figure 4:
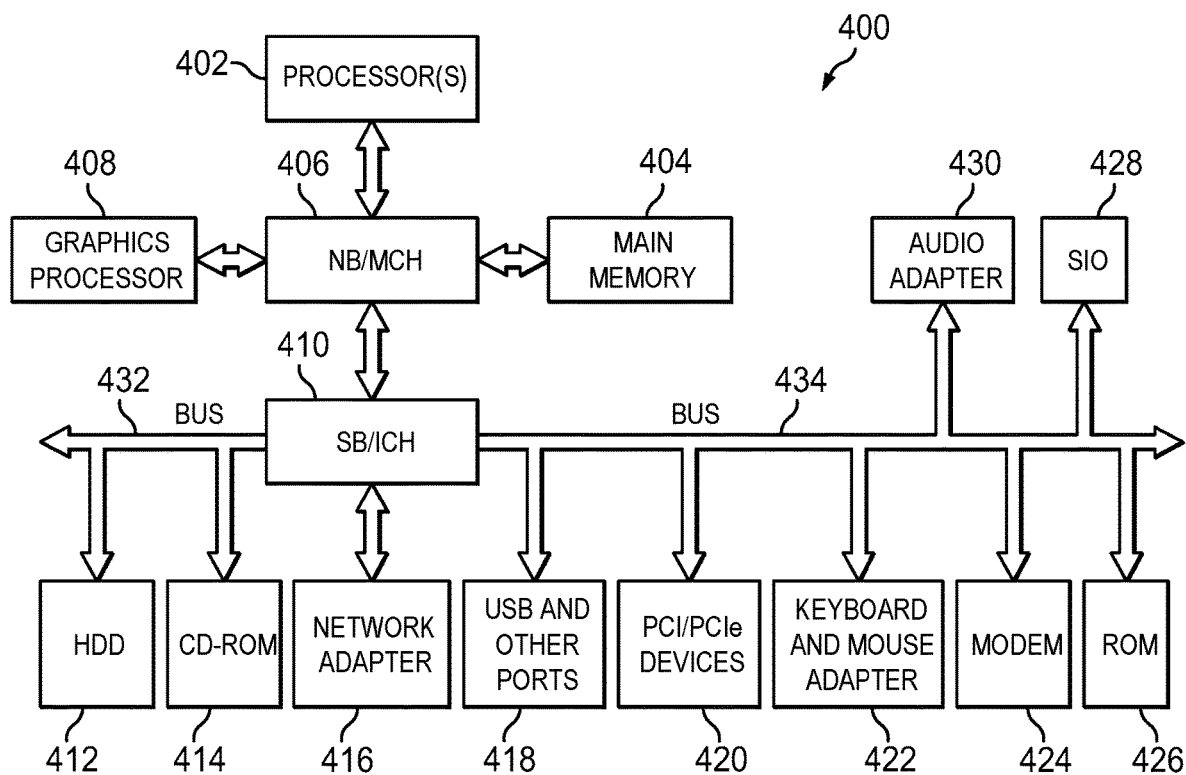
FIG. 4 is a block diagram illustrating a hardware architecture of a system according to an embodiment of the present disclosure in which aspects of the illustrative embodiments may be implemented.

FIG. 4 is a block diagram illustrating a hardware architecture of a system 400 according to an embodiment of the present disclosure in which aspects of the illustrative embodiments may be implemented. For example, in one embodiment, the NER system 100 in FIG. 1 and FIG. 2 may be implemented using the data processing system 400. Additionally, the data processing system 400 may be configured to store and execute instructions for performing the process described in FIG. 3. In the depicted example, the data processing system 400 employs a hub architecture including north bridge and memory controller hub (NB/MCH) 406 and south bridge and input/output (I/O) controller hub (SB/ICH) 410. Processor(s) 402, main memory 404, and graphics processor 408 are connected to NB/MCH 406. Graphics processor 408 may be connected to NB/MCH 406 through an accelerated graphics port (AGP). A computer bus, such as bus 432 or bus 434, may be implemented using any type of communication fabric or architecture that provides for a transfer of data between different components or devices attached to the fabric or architecture.

In the depicted example, network adapter 416 connects to SB/ICH 410. Audio adapter 430, keyboard and mouse adapter 422, modem 424, read-only memory (ROM) 426, hard disk drive (HDD) 412, compact disk read-only memory (CD-ROM) drive 414, universal serial bus (USB) ports and other communication ports 418, and peripheral component interconnect/peripheral component interconnect express (PCI/PCIe) devices 420 connect to SB/ICH 410 through bus 432 and bus 434. PCI/PCIe devices may include, for example, Ethernet adapters, add-in cards, and personal computing (PC) cards for notebook computers. PCI uses a card bus controller, while PCIe does not. ROM 426 may be, for example, a flash basic input/output system (BIOS). Modem 424 or network adapter 416 may be used to transmit and receive data over a network.

HDD 412 and CD-ROM drive 414 connect to SB/ICH 410 through bus 434. HDD 412 and CD-ROM drive 414 may use, for example, an integrated drive electronics (IDE) or serial advanced technology attachment (SATA) interface. In some embodiments, HDD 412 may be replaced by other forms of data storage devices including, but not limited to, solid-state drives (SSDs). A super I/O (SIO) device 428 may be connected to SB/ICH 410. SIO device 428 may be a chip on the motherboard that is configured to assist in performing less demanding controller functions for the SB/ICH 410 such as controlling a printer port, controlling a fan, and/or controlling the small light emitting diodes (LEDS) of the data processing system 400.

The data processing system 400 may include a single processor 402 or may include a plurality of processors 402. Additionally, processor(s) 402 may have multiple cores. For example, in one embodiment, data processing system 400 may employ a large number of processors 402 that include hundreds or thousands of processor cores. In some embodiments, the processors 402 may be configured to perform a set of coordinated computations in parallel.

An operating system is executed on the data processing system 400 using the processor(s) 402. The operating system coordinates and provides control of various components within the data processing system 400 in FIG. 4. Various applications and services may run in conjunction with the operating system. Instructions for the operating system, applications, and other data are located on storage devices, such as one or more HDD 412, and may be loaded into main memory 404 for execution by processor(s) 402. In some embodiments, additional instructions or data may be stored on one or more external devices. The processes described herein for the illustrative embodiments may be performed by processor(s) 402 using computer usable program code, which may be located in a memory such as, for example, main memory 404, ROM 426, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

training, using machine learning, an auto-seed model to predict a usefulness of relationship data;

crawling for documents based on a seed Uniform Resource Locator (URL) list;

generating relations data from the documents using a Natural Language Processing (NLP) model, wherein the relations data comprises a plurality of entities and relationship data indicating how the plurality of entities are related to each other, and wherein the NLP model has been trained using sample annotated documents to be able to perform automated annotations on the documents to generate the relations data;

analyzing the relations data using the auto-seed model to predict the usefulness of relationship data generated from the documents, wherein the relations data is deemed useful when more than a predetermined number of the entities in the relations data generated from the documents have a direct relationship indicating how a first entity is related to a second entity; and modifying the seed URL list based on the predicted usefulness of the relationship data, wherein modifying the seed URL list comprises expanding the seed URL list to include a new seed URL, the new seed URL predicted to produce quality relations data by the NLP model.

2. The method of claim 1, wherein modifying the seed URL list comprises removing a seed URL from the seed URL list.

3. The method of claim 1, further comprising:
generating a randomly generated seed URL list; and
selecting the new seed URL from the randomly generated seed URL list.

4. The method of claim 1, further comprising:
generating a search engine generated seed URL list; and
selecting the new seed URL from the search engine generated seed URL list.

5. The method of claim 1, further comprising:
generating an extended seed URL list; and
selecting the new seed URL from the extended seed URL list.

6. The method of claim 1, wherein modifying the seed URL list comprises expanding the seed URL list to include a new seed URL selected from a combination of a randomly generated seed URL list, a search engine generated seed URL list, and an extended seed URL list.

7. A system comprising memory for storing instructions, and a processor configured to execute the instructions to:
train, using machine learning, an auto-seed model to predict a usefulness of relationship data;
crawl for documents based on a seed Uniform Resource Locator (URL) list;
generate relations data from the documents using a Natural Language Processing (NLP) model, wherein the relations data comprises a plurality of entities and relationship data indicating how the plurality of entities are related to each other, and wherein the NLP model has been trained using sample annotated documents to be able to perform automated annotations on the documents to generate the relations data;
analyze the relations data using the auto-seed model to predict the usefulness of relationship data generated from the documents, wherein the relations data is deemed useful when more than a predetermined number of the entities in the relations data generated from the documents have a direct relationship indicating how a first entity is related to a second entity; and
modify the seed URL list based on the predicted usefulness of the relationship data wherein modifying the seed URL list comprises expanding the seed URL list to include a new seed URL, the new seed URL predicted to produce quality relations data by the NLP model.

8. The system of claim 7, wherein modifying the seed URL list comprises removing a seed URL from the seed URL list.

9. The system of claim 7, wherein the processor is configured to execute the instructions to:
generate a randomly generated seed URL list; and
select the new seed URL from the randomly generated seed URL list.

10. The system of claim 7, wherein the processor is configured to execute the instructions to:
generate a search engine generated seed URL list; and
select the new seed URL from the search engine generated seed URL list.

11. The system of claim 7, wherein the processor is configured to execute the instructions to:
generate an extended seed URL list; and
select the new seed URL from the extended seed URL list.

12. The system of claim 7, wherein modifying the seed URL list comprises expanding the seed URL list to include a new seed URL selected from a combination of a randomly generated seed URL list, a search engine generated seed URL list, and an extended seed URL list.

13. A computer program product comprising a computer readable storage medium having program instructions embodied therewith, the program instructions executable by a processor of a system to cause the system to:
train, using machine learning, an auto-seed model to predict a usefulness of relationship data;
crawl for documents based on a seed Uniform Resource Locator (URL) list;
generate relations data from the documents using a Natural Language Processing (NLP) model, wherein the relations data comprises a plurality of entities and relationship data indicating how the plurality of entities are related to each other, and wherein the NLP model has been trained using sample annotated documents to be able to perform automated annotations on the documents to generate the relations data;
analyze the relations data using the auto-seed model to predict the usefulness of relationship data generated from the documents, wherein the relations data is deemed useful when more than a predetermined number of the entities in the relations data generated from the documents have a direct relationship indicating how a first entity is related to a second entity; and
modify the seed URL list based on the predicted usefulness of the relationship data, wherein modifying the seed URL list comprises expanding the seed URL list to include a new seed URL, the new seed URL predicted to produce quality relations data by the NLP model.

14. The computer program product of claim 13, wherein modifying the seed URL list comprises removing a seed URL from the seed URL list.

15. The computer program product of claim 13, wherein the program instructions executable by the processor of the system further causes the system to:
generate a randomly generated seed URL list; and
select the new seed URL from the randomly generated seed URL list.

16. The computer program product of claim 13, wherein the program instructions executable by the processor of the system further causes the system to:
generate a search engine generated seed URL list; and
select the new seed URL from the search engine generated seed URL list.

17. The computer program product of claim 13, wherein the program instructions executable by the processor of the system further causes the system to:
generate an extended seed URL list; and
select the new seed URL from the extended seed URL list.

* * * * *